(12) United States Patent
Ono (10) Patent No.: US 9,758,205 B2
(45) Date of Patent: Sep. 12, 2017

(54) TWO-WHEELED VEHICLE OVERTURN PREVENTION METHOD AND DEVICE

(71) Applicant: Bosch Corporation, Tokyo (JP)

(72) Inventor: Shunsaku Ono, Kanagawa (JP)

(73) Assignee: Bosch Corporation, Tokyo (JP)

( * ) Notice: Subject to any disclaimer, the term of this patent is extended or adjusted under 35 U.S.C. 154(b) by 205 days.

(21) Appl. No.: 14/415,799

(22) PCT Filed: Apr. 25, 2013

(86) PCT No.: PCT/JP2013/062217
§ 371 (c)(1),
(2) Date: Jan. 20, 2015

(87) PCT Pub. No.: WO2014/017138
PCT Pub. Date: Jan. 30, 2014

(65) Prior Publication Data
US 2015/0183480 A1    Jul. 2, 2015

(30) Foreign Application Priority Data

Jul. 25, 2012  (JP) .................................. 2012-164781

(51) Int. Cl.
*B62J 27/00* (2006.01)
*F02D 29/02* (2006.01)
(Continued)

(52) U.S. Cl.
CPC .............. *B62J 27/00* (2013.01); *B60W 30/02* (2013.01); *B60W 30/18145* (2013.01);
(Continued)

(58) Field of Classification Search
None
See application file for complete search history.

(56) References Cited

U.S. PATENT DOCUMENTS 4,989,922 A * 2/1991 Pickenhahn .......... B60T 8/1706
                                                            180/219
5,217,087 A * 6/1993 Ikegami ................. B60Q 1/122
                                                            180/219
(Continued)

FOREIGN PATENT DOCUMENTS

DE          3839520 A1    5/1990
DE    102008001970 A1   12/2009
(Continued)

OTHER PUBLICATIONS

"Kurvenfahrt mit Gas?", (Apr. 20, 2009), p. 5PP, MOTORRD online24, URL: http://www.motorradonline24.de/mo24forum/bike-und-biker/biker-stammtisch/622770/kurvenfahrt-mit-gas/, (Jun. 15, 2016), XP002758785 [Y] 9 * p. 1, comment from "Voidhawk" p. 2, comment from "mille".

(Continued)

*Primary Examiner* — Jerrah Edwards
*Assistant Examiner* — Donald J Wallace
(74) *Attorney, Agent, or Firm* — Michael Best & Friedrich LLP (57) ABSTRACT

There is provided a two-wheeled vehicle overturn prevention method, wherein maximum allowable lean angles corresponding to vehicle body velocities are preset in relation to lean angles of a vehicle body, and in a case where an actual lean angle of the vehicle body exceeds a maximum allowable lean angle corresponding to an actual vehicle body velocity of the vehicle body or in a case where an estimated lean angle of the vehicle body after a predetermined amount of time exceeds or looks to exceed a maximum allowable lean angle corresponding to an estimated vehicle body velocity, the two-wheeled vehicle overturn prevention method is adapted to accelerate the vehicle body or keep the vehicle body from decelerating.

22 Claims, 7 Drawing Sheets

(51) Int. Cl.
*B60W 30/02* (2012.01)
*B60W 30/18* (2012.01)
*B60W 30/04* (2006.01)
*B60W 50/00* (2006.01)

(52) U.S. Cl.
CPC ......... *B60W 50/0097* (2013.01); *F02D 29/02* (2013.01); *B60W 2030/043* (2013.01); *B60W 2050/0011* (2013.01); *B60W 2300/36* (2013.01); *B60W 2520/10* (2013.01); *B60W 2520/105* (2013.01); *B60W 2520/125* (2013.01); *B60W 2520/14* (2013.01); *B60W 2520/18* (2013.01); *B60W 2710/0666* (2013.01); *B60W 2720/106* (2013.01); *B60Y 2200/12* (2013.01); *Y02T 10/84* (2013.01)

(56) References Cited

U.S. PATENT DOCUMENTS

| | | | | |
|---|---|---|---|---|
| 6,034,594 | A * | 3/2000 | Gray | B60Q 1/52 116/28 A |
| 9,189,454 | B2 * | 11/2015 | Fukushima | B60W 40/112 |
| 2004/0098185 | A1 * | 5/2004 | Wang | B60T 8/1706 701/70 |
| 2004/0254702 | A1 * | 12/2004 | Mueller | B62H 1/10 701/38 |
| 2006/0231313 | A1 * | 10/2006 | Ishii | A63C 17/12 180/218 |
| 2007/0227789 | A1 * | 10/2007 | Imura | B60K 6/44 180/65.235 |
| 2008/0228357 | A1 * | 9/2008 | Hirata | A63H 17/16 701/46 |
| 2008/0249684 | A1 * | 10/2008 | Hirata | A63H 17/16 701/41 |
| 2009/0222164 | A1 * | 9/2009 | Seiniger | B60T 8/1706 701/36 |
| 2009/0265058 | A1 * | 10/2009 | Hasegawa | F02D 29/02 701/31.4 |
| 2011/0067939 | A1 * | 3/2011 | Takenaka | B62K 11/007 180/21 |
| 2011/0118941 | A1 * | 5/2011 | Linker | B62J 27/00 701/42 |
| 2011/0172881 | A1 * | 7/2011 | Seidel | B60T 8/1706 701/37 |
| 2013/0090828 | A1 * | 4/2013 | Lemejda | B60W 10/06 701/83 |
| 2013/0238206 | A1 * | 9/2013 | Lemejda | B60T 8/1706 701/70 |
| 2013/0282253 | A1 * | 10/2013 | Ono | B60T 8/1706 701/72 |
| 2014/0200780 | A1 * | 7/2014 | Watanabe | B60T 8/1706 701/68 |
| 2015/0021865 | A1 * | 1/2015 | Lin | B60G 21/005 280/5.513 |
| 2015/0091287 | A1 * | 4/2015 | Lich | B60R 22/322 280/801.1 |
| 2015/0203110 | A1 * | 7/2015 | Moerbe | B60T 7/12 701/72 |

FOREIGN PATENT DOCUMENTS

| | | |
|---|---|---|
| DE | 102009046226 A1 | 5/2011 |
| DE | 102009054756 A1 | 6/2011 |
| DE | 102010003951 A1 | 10/2011 |
| JP | 03016889 | 1/1991 |
| JP | 2004099026 | 4/2004 |
| JP | 2004155412 | 6/2004 |

OTHER PUBLICATIONS

International Search Report for Application No. PCT/JP2013/062217 dated Jul. 30, 2013 (English Translation, 1 page).

* cited by examiner

1   VEHICLE VELOCITY SENSOR
2   LEAN ANGLE SENSOR
3   LEAN ANGLE CALCULATING MEANS
4   INSTABILITY JUDGING MEANS
5   DRIVE ADDITION QUANTITY CALCULATING MEANS
6   DRIVE FORCE INCREASE INSTRUCTING MEANS

FIG. 2B

1   VEHICLE VELOCITY SENSOR
2   LEAN ANGLE SENSOR
3   LEAN ANGLE CALCULATING MEANS
4   INSTABILITY JUDGING MEANS
5   DRIVE ADDITION QUANTITY CALCULATING MEANS
6   DRIVE FORCE INCREASE INSTRUCTING MEANS
7   VEHICLE BODY VELOCITY STORING MEANS
8   VEHICLE BODY VELOCITY ESTIMATING MEANS
9   LEAN ANGLE STORING MEANS
10  LEAN ANGLE ESTIMATING MEANS

FIG. 3A

S1  ACQUIRE OUTPUT VALUE OF VEHICLE VELOCITY SENSOR
S2  IS ACTUAL VEHICLE BODY VELOCITY Va EQUAL TO OR LOWER THAN PREDETERMINED VALUE?
S3  ACQUIRE OUTPUT VALUE OF LEAN ANGLE SENSOR
S4  CALCULATE ACTUAL LEAN ANGLE θ
S5  IS TRAVELING STATE UNSTABLE?
S6  CALCULATE DRIVE ADDITION QUANTITY
S7  OUTPUT DRIVE ADDITION QUANTITY TO ENGINE ECU

FIG. 3B

S11  ACQUIRE OUTPUT VALUE OF VEHICLE VELOCITY SENSOR
S12  IS ACTUAL VEHICLE BODY VELOCITY Va EQUAL TO OR LOWER THAN PREDETERMINED VALUE?
S13  CALCULATE ESTIMATED VEHICLE BODY VELOCITY Ve
S14  CALCULATE ESTIMATED LEAN ANGLE Θ
S15  IS TRAVELING STATE UNSTABLE?
S16  CALCULATE DRIVE ADDITION QUANTITY
S17  OUTPUT DRIVE ADDITION QUANTITY TO ENGINE ECU

FIG. 5

TWO-WHEELED VEHICLE OVERTURN PREVENTION METHOD AND DEVICE

BACKGROUND OF THE INVENTION

The present invention relates to a two-wheeled vehicle and particularly relates to a two-wheeled motor vehicle overturn prevention method and device.

In order to improve the traveling stability of a two-wheeled vehicle particularly when traveling around a curve, a two-wheeled motor vehicle engine torque adjustment method such as described in JP-A-2004-99026, for example, is known. In this device, a maximum value of the acceleration force or acceleration in the traveling direction is found as a function of the centrifugal force or lateral acceleration acting on the vehicle body during travel around a curve, and the engine torque is controlled so as to not exceed the maximum value that has been found. That is, the two-wheeled vehicle is kept from accelerating so as to prevent sideways skidding of the vehicle wheels when traveling around a curve. This is because too much acceleration or braking of the two-wheeled vehicle during travel around a curve at a high velocity will cause the tires to skid sideways.

SUMMARY OF THE INVENTION

However, in the above-described conventional art, no consideration is given to traveling instability of the two-wheeled vehicle in the low-velocity region. When a rider drives a two-wheeled motor vehicle, oftentimes the two-wheeled motor vehicle loses balance and overturns in the low-velocity region, and when the rider makes a right turn at a low velocity with the handlebar turned, particularly such as when making a U-turn, there are cases where the right hand of the rider comes into contact with the fuel tank and cannot open the accelerator, so that the two-wheeled motor vehicle loses velocity and overturns. Compared to the high-velocity region, in the low-velocity region, even small changes in velocity greatly affect the traveling stability of the vehicle body.

In light of this, it is an object of the present invention to ensure the traveling stability of a two-wheeled vehicle particularly in the low-velocity region.

According to the invention, there is provided a two-wheeled vehicle overturn prevention method, wherein maximum allowable lean angles corresponding to vehicle body velocities are preset in relation to lean angles of a vehicle body, an estimated lean angle, which is a lean angle of the vehicle body after a predetermined amount of time, is estimated on the basis of a temporal change in an actual lean angle of the vehicle body, an estimated vehicle body velocity, which is a vehicle body velocity of the vehicle body after the predetermined amount of time, is estimated on the basis of a temporal change in an actual vehicle body velocity of the vehicle body, and in a case where the estimated lean angle exceeds or looks to exceed a maximum allowable lean angle corresponding to the estimated vehicle body velocity, the two-wheeled vehicle overturn prevention method is adapted to accelerate the vehicle body or keep the vehicle body from decelerating. According to this configuration, maximum allowable lean angles corresponding to vehicle body velocities are preset in relation to lean angles of a vehicle body, an estimated lean angle, which is a lean angle of the vehicle body after a predetermined amount of time, is estimated on the basis of a temporal change in an actual lean angle of the vehicle body, an estimated vehicle body velocity, which is a vehicle body velocity of the vehicle body after the predetermined amount of time, is estimated on the basis of a temporal change in an actual vehicle body velocity of the vehicle body, and in a case where the estimated lean angle exceeds or looks to exceed a maximum allowable lean angle corresponding to the estimated vehicle body velocity, the two-wheeled vehicle overturn prevention method is adapted to accelerate the vehicle body or keep the vehicle body from decelerating, so the two-wheeled vehicle can be prevented from overturning without changing the will of the driver relating to the turning radius particularly when traveling around a curve at a low speed at which it is easy for the two-wheeled vehicle to lose balance, such as a U-turn. Furthermore, the traveling state after the predetermined amount of time is estimated and control is performed, so the drive force of the engine can be changed to accelerate the vehicle body at an appropriate timing or the vehicle body can be kept from decelerating.

According to the another aspect of the invention, in a case where the estimated lean angle exceeds a maximum allowable lean angle corresponding to the estimated vehicle body velocity, an engine drive addition quantity is calculated so as to minimize the difference between a vehicle body velocity corresponding to the estimated lean angle serving as a maximum allowable lean angle and the estimated vehicle body velocity.

According to another aspect of the invention, there is provided a two-wheeled vehicle overturn prevention method, wherein maximum allowable lean angles corresponding to vehicle body velocities are preset in relation to lean angles of a vehicle body, and in a case where an actual lean angle of the vehicle body exceeds a maximum allowable lean angle corresponding to an actual vehicle body velocity of the vehicle body, the two-wheeled vehicle overturn prevention method is adapted to accelerate the vehicle body. According to this configuration, maximum allowable lean angles corresponding to vehicle body velocities are preset in relation to lean angles of a vehicle body, and in a case where an actual lean angle of the vehicle body exceeds a maximum allowable lean angle corresponding to an actual vehicle body velocity of the vehicle body, the two-wheeled vehicle overturn prevention method is adapted to accelerate the vehicle body, so the two-wheeled vehicle can be prevented from overturning without changing the will of the driver relating to the turning radius particularly when traveling around a curve at a low speed at which it is easy for the two-wheeled vehicle to lose balance, such as a U-turn.

According to another aspect of the invention, in a case where an actual lean angle of the vehicle body exceeds a maximum allowable lean angle corresponding to an actual vehicle body velocity of the vehicle body, an engine drive addition quantity is calculated so as to minimize the difference between a vehicle body velocity corresponding to the actual lean angle serving as a maximum allowable lean angle and the actual vehicle body velocity.

According to another aspect of the invention the drive addition quantity is calculated by PID control.

According to another aspect of the invention, a maximum value of the drive addition quantity is preset, and in a case where the drive addition quantity that has been calculated has maintained the maximum value over a predetermined amount of time, the drive addition quantity is changed to zero. According to this configuration, a maximum value of the drive addition quantity is preset, and in a case where the drive addition quantity that has been calculated has maintained the maximum value over a predetermined amount of time, the drive addition quantity is changed to zero, so the two-wheeled vehicle can be prevented from being accelerated more than necessary in a case where an error has occurred in the lean angle detection value or the vehicle velocity correction amount.

According to another aspect of the invention, the method is executed only in a predetermined vehicle body velocity region. According to this configuration, the method is executed only in a predetermined vehicle body velocity region, so the two-wheeled vehicle can be prevented from being further accelerated when traveling at a high speed.

According to another aspect of the invention, an actual lean angle of the vehicle body is calculated on the basis of an output value of a lean angle sensor, and the lean angle sensor is at least one of a lateral acceleration sensor, a vertical acceleration sensor, a yaw rate sensor, and a roll rate sensor.

According to another aspect of the invention, there is provided a two-wheeled vehicle overturn prevention device comprising: a vehicle velocity sensor that detects a vehicle body velocity; a lean angle sensor for detecting a lean angle of a vehicle body; lean angle calculating means that calculates a lean angle of the vehicle body on the basis of an output value of the lean angle sensor; instability judging means that judges traveling instability of the vehicle body on the basis of the vehicle body velocity and the lean angle; drive addition quantity calculating means that calculates an engine drive addition quantity in a case where it has been judged by the instability judging means that the vehicle body is unstable; and drive force increase instructing means that outputs a drive addition quantity to an engine ECU. According to this configuration, the two-wheeled vehicle overturn prevention device is equipped with instability judging means that judges traveling instability of the vehicle body on the basis of the vehicle body velocity and the lean angle and drive addition quantity calculating means that calculates an engine drive addition quantity in a case where it has been judged by the instability judging means that the vehicle body is unstable, so the two-wheeled vehicle can be prevented from overturning without changing the will of the driver relating to the turning radius particularly when traveling around a curve at a low speed at which it is easy for the two-wheeled vehicle to lose balance, such as a U-turn.

According to another aspect of the invention, the device further comprises vehicle body velocity storing means that stores an output value of the vehicle velocity sensor, lean angle storing means that stores an output value of the lean angle calculating means, vehicle body velocity estimating means that calculates an estimated vehicle body velocity, which is a vehicle body velocity of the vehicle body after a predetermined amount of time, on the basis of a temporal change in an output value of the vehicle velocity sensor, and lean angle estimating means that calculates an estimated lean angle, which is a lean angle of the vehicle body after a predetermined amount of time, on the basis of a temporal change in an output value of the lean angle calculating means, wherein the instability judging means judges traveling instability of the vehicle body on the basis of the estimated vehicle body velocity and the estimated lean angle. According to this configuration, the two-wheeled vehicle overturn prevention device is equipped with vehicle body velocity storing means that stores an output value of the vehicle velocity sensor, lean angle storing means that stores an output value of the lean angle calculating means, vehicle body velocity estimating means that calculates an estimated vehicle body velocity, which is a vehicle body velocity of the vehicle body after a predetermined amount of time, on the basis of a temporal change in an output value of the vehicle velocity sensor, and lean angle estimating means that calculates an estimated lean angle, which is a lean angle of the vehicle body after a predetermined amount of time, on the basis of a temporal change in an output value of the lean angle calculating means, wherein the instability judging means judges traveling instability of the vehicle body on the basis of the estimated vehicle body velocity and the estimated lean angle, so the two-wheeled vehicle can be prevented from overturning without changing the will of the driver relating to the turning radius particularly when traveling around a curve at a low speed at which it is easy for the two-wheeled vehicle to lose balance, such as a U-turn. Furthermore, the traveling state after the predetermined amount of time is estimated and control is performed, so the drive force of the engine can be changed to accelerate the vehicle body at an appropriate timing or the vehicle body can be kept from decelerating.

According to another aspect of the invention maximum allowable lean angles corresponding to vehicle body velocities are preset in relation to lean angles of a vehicle body, and the instability judging means judges traveling instability of the vehicle body on the basis of the vehicle body velocity, the lean angle that has been calculated, and the maximum allowable lean angle.

According to another aspect of the invention, the drive addition quantity calculating means calculates an engine drive addition quantity so as to minimize the difference between a vehicle body velocity corresponding to the calculated lean angle serving as a maximum allowable lean angle and the vehicle body velocity that has been detected.

According to another aspect of the invention, maximum allowable lean angles corresponding to vehicle body velocities are preset in relation to lean angles of a vehicle body, and the instability judging means judges traveling instability of the vehicle body on the basis of the estimated vehicle body velocity, the estimated lean angle, and the maximum allowable lean angle.

According to another aspect of the invention, the drive addition quantity calculating means calculates an engine drive addition quantity so as to minimize the difference between a vehicle body velocity corresponding to the estimated lean angle serving as a maximum allowable lean angle and the estimated vehicle body velocity.

According to another aspect of the invention, the drive addition quantity calculating means calculates a drive addition quantity by PID control.

According to another aspect of the invention, a maximum value of the drive addition quantity is preset, and the two-wheeled vehicle overturn prevention device further comprises drive force increase limiting means which, in a case where the drive addition quantity that has been calculated has maintained the maximum value over a predetermined amount of time, changes the drive addition quantity to zero. According to this configuration, a maximum value of the drive addition quantity is preset, and the two-wheeled vehicle overturn prevention device further comprises drive force increase limiting means which, in a case where the drive addition quantity that has been calculated has maintained the maximum value over a predetermined amount of time, changes the drive addition quantity to zero, so the two-wheeled vehicle can be prevented from being accelerated more than necessary in a case where an error has occurred in the lean angle detection value or the vehicle velocity correction amount.

According to another aspect of the invention, the two-wheeled vehicle overturn prevention device acts only in a predetermined vehicle body velocity region. According to this configuration, the two-wheeled vehicle overturn prevention device acts only in a predetermined vehicle body velocity region, so the two-wheeled vehicle can be prevented from being further accelerated when traveling at a high speed.

According to another aspect of the invention, the lean angle sensor is at least one of a lateral acceleration sensor, a vertical acceleration sensor, a yaw rate sensor, and a roll rate sensor.

According to the present invention, the traveling stability of a two-wheeled vehicle particularly in the low-velocity region can be ensured.

DETAILED DESCRIPTION

Embodiments of the present invention will be described below with reference to the attached drawings.

Figure 1:
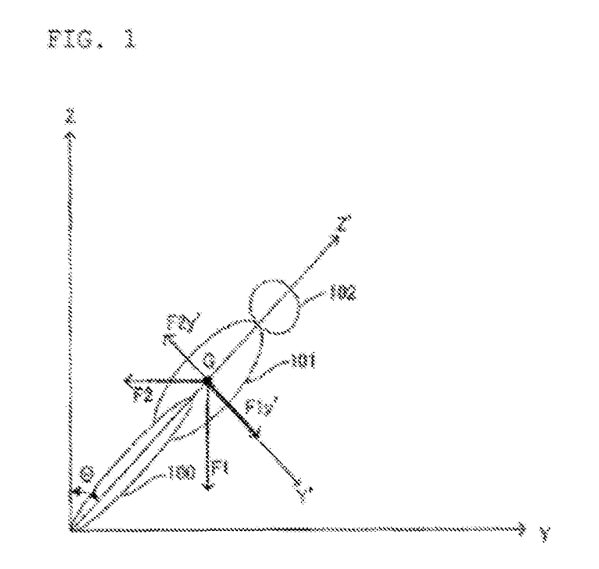
FIG. 1 is a drawing schematically showing forces acting on a leaning two-wheeled vehicle.

First, the principle of the method of the present invention will be described. A load in the direction of gravity and an outward centrifugal force act on a leaning two-wheeled vehicle. When these force are schematically represented using Y-Z coordinates, they appear as shown in FIG. 1. FIG. 1 is a front view (or a back view) of a two-wheeled vehicle and a driver when making a right turn, and the two-wheeled vehicle has an inwardly leaning posture in relation to the turning radius direction. In FIG. 1, 100 denotes the vehicle wheels of the two-wheeled vehicle and 101 denotes the upper structure of the two-wheeled vehicle including the driver. 102 denotes the head of the driver. $\theta$ is the lean angle (the angle of inclination relative to the direction of gravity) of the two-wheeled vehicle. The load and the centrifugal force are denoted by vectors F1 and F2, respectively, taking a center of gravity G of the two-wheeled vehicle including the driver as an initial point. As shown in FIG. 1, when Y'-Z' coordinates taking the center of gravity G as an origin are defined, it will be understood that in order to maintain the lean angle $\theta$ at a constant, it is necessary for the Y' component F1$y'$ of the load F1 and the Y' component F2$y'$ of the centrifugal force F2 to be in balance. At this time:

$$|F1y'|=|F2y'|$$

In the case of $|F1y'|>|F2y'|$, the lean angle $\theta$ is large and the vehicle body moves in the direction in which it falls over. On the other hand, in the case of $|F1y'|<|F2y'|$, the lean angle $\theta$ is small and the vehicle body moves in the direction in which it is righted.

Here, assuming that m represents the load, which is to say the combined load of the two-wheeled vehicle and the driver, r represents the turning radius when traveling around a curve, and v represents the vehicle body velocity of the two-wheeled vehicle, the centrifugal force $F2=mv^2/r$ and consequently $F2y'=mv^2/r \cdot \cos\theta$.

From this, it will be understood that the vehicle body velocity v must be increased in order to ensure that the vehicle body does not fall over without changing the will of the driver (that is, without changing the turning radius r). According to the present invention, the two-wheeled vehicle can be prevented from overturning, for example, by deciding beforehand, in accordance with the vehicle body velocity v, the lean angle $\theta$ at which there is the concern that the vehicle body will overturn and increasing the vehicle body velocity v in a case where the actual lean angle $\theta$ exceeds that lean angle $\theta$. In other words, the two-wheeled vehicle can be prevented from overturning by deciding beforehand, in accordance with the lean angle $\theta$, the vehicle body velocity v at which there is the concern that the two-wheeled vehicle will overturn and controlling the drive force of the engine so that the velocity does not become equal to or lower than that velocity v.

In this specification, "lean angle" means a lateral lean angle and "lateral" means "laterally relative to the traveling direction" or "laterally relative to the major axis of the two-wheeled vehicle".

Figure 2A:
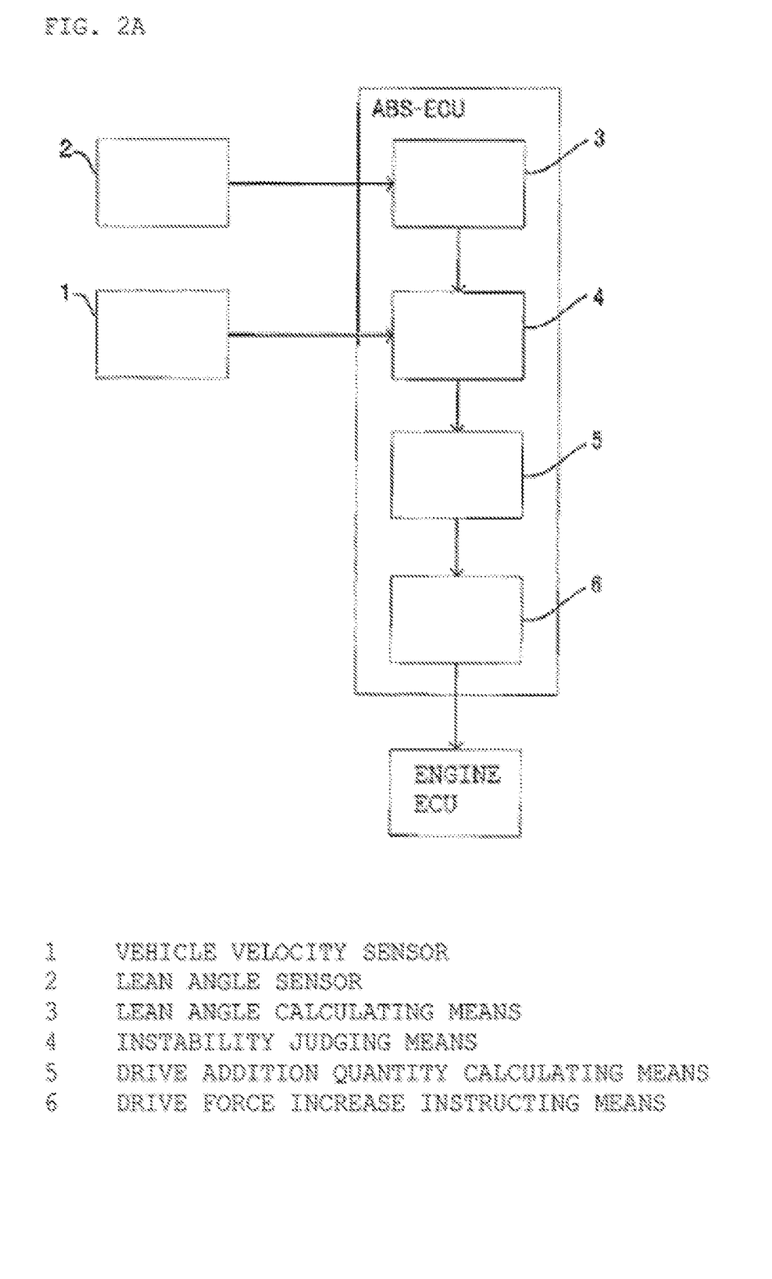
FIG. 2A is a system configuration diagram including the device of the present invention.

FIG. 2A is an example of a system configuration diagram including a two-wheeled vehicle overturn prevention device according to an embodiment of the present invention. The two-wheeled vehicle overturn prevention device of the present invention is equipped with a vehicle velocity sensor 1 that detects a vehicle body velocity, a lean angle sensor 2 for detecting a lean angle of a vehicle body, lean angle calculating means 3 that calculates the lean angle of the vehicle body on the basis of an output value of the lean angle sensor 2, instability judging means 4 that judges traveling instability of the vehicle body on the basis of the vehicle body velocity and the lean angle, drive addition quantity calculating means 5 that calculates an engine drive addition quantity in a case where it has been judged by the instability judging means 4 that the vehicle body is unstable, and drive force increase instructing means 6 that outputs a drive addition quantity to an engine ECU (electronic control unit). As shown in FIG. 2A, the lean angle calculating means 3, the instability judging means 4, the drive addition quantity calculating means 5, and the drive force increase instructing means 6 can be incorporated into an existing ABS-ECU. Furthermore, the two-wheeled vehicle overturn prevention device of the present invention may also be equipped with drive force increase limiting means not shown in the drawings. The drive force increase limiting means can change the drive addition quantity to zero to ensure that the vehicle body is not automatically accelerated in a case where the drive addition quantity that has been calculated by the drive addition quantity calculating means 5 has been maintained at a predetermined maximum value over a predetermined amount of time.

As the lean angle sensor 2, for example, a lateral acceleration sensor, a vertical acceleration sensor, a yaw rate sensor, and a roll rate sensor can be used. A lateral acceleration sensor can be used as the lean angle sensor 2 because it detects the gravitational acceleration of the sine component of the lean angle when the vehicle body has been leaned. Likewise, a vertical (height direction of the vehicle body) acceleration sensor can also be used. However, when only a lateral acceleration sensor or only a vertical acceleration sensor is used as the lean angle sensor, there are cases where, depending on the balance between the centrifugal force and gravity, the measured acceleration is extremely small and it is difficult to calculate the lean angle.

For this reason, in the case of using an acceleration sensor as the lean angle sensor, it is necessary to use both a lateral acceleration sensor and a vertical acceleration sensor. In the case of using a yaw rate sensor, the lean angle θ can be calculated by time integrating the detected yaw rate. In addition, the lean angle θ can also be found using an optical sensor or an acoustic sensor. For example, two transmitters and two receivers can be attached to both sides of the vehicle body. In this case, the signals sent from the two transmitters are reflected by the road surface and received by the receivers, and the lean angle θ can be found on the basis of the difference in the time required by the signals. A method of using a yaw rate sensor to calculate the lean angle is described in JP-A-2004-155412, for example, and a method of using an optical sensor or an acoustic sensor to calculate the lean angle is described in JP-A-2004-83009, for example.

Figure 2B:
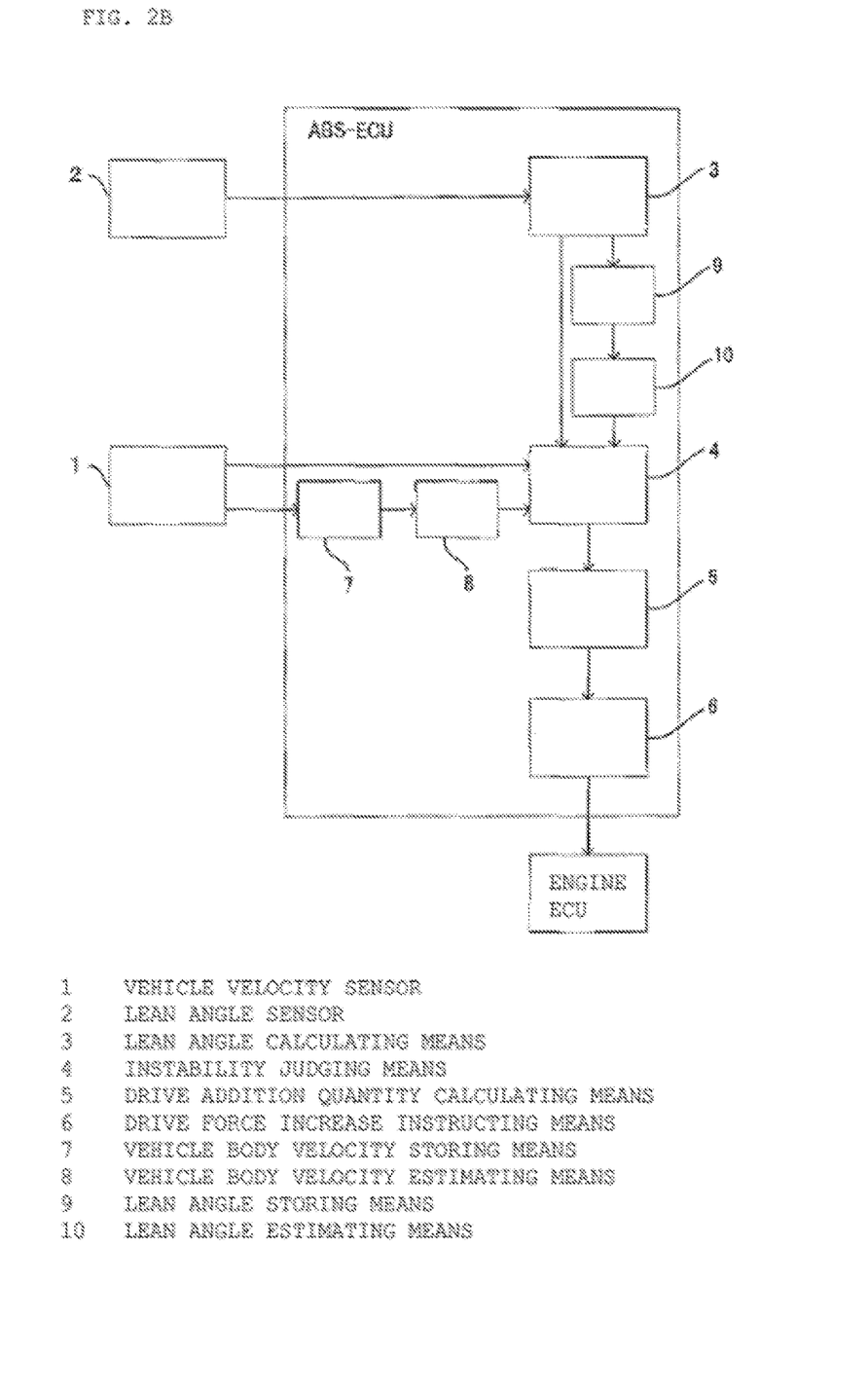
FIG. 2B is a system configuration diagram including another embodiment of the device of the present invention.

FIG. 2B shows an example of a system configuration diagram including a two-wheeled vehicle overturn prevention device according to another embodiment of the present invention. The two-wheeled vehicle overturn prevention device in the present embodiment is further equipped, in addition to the elements shown in FIG. 2A, with vehicle body velocity storing means 7 that stores an output value of the vehicle velocity sensor 1, vehicle body velocity estimating means 8 that calculates an estimated vehicle body velocity, which is a vehicle body velocity of the vehicle body after a predetermined amount of time, on the basis of a temporal change in the output value of the vehicle body sensor 1, lean angle storing means 9 that stores an output value of the lean angle calculating means 3, and lean angle estimating means 10 that calculates an estimated lean angle, which is a lean angle of the vehicle body after a predetermined amount of time, on the basis of a temporal change in the output value of the lean angle calculating means 3. These additional means can also be incorporated into an existing ABS-ECU. In this case, the instability judging means 4 judges instability of the vehicle body on the basis of the estimated vehicle body velocity that has been calculated by the vehicle body velocity estimating means 8 and the estimated lean angle that has been calculated by the lean angle estimating means 10. Furthermore, like the embodiment of FIG. 2A, in the present embodiment also, the two-wheeled overturn prevention device can be equipped with drive force increase limiting means not shown in the drawings. The drive force increase limiting means can change the drive addition quantity to zero to ensure that the vehicle body is not automatically accelerated in a case where the drive addition quantity that has been calculated by the drive addition quantity calculating means 5 has been maintained at a predetermined maximum value over a predetermined amount of time. According to the present embodiment, the traveling state of the vehicle body after a predetermined amount of time can be estimated and control can be performed, so the vehicle body can be accelerated at a more appropriate timing or the vehicle body can be kept from decelerating, and because of this, the two-wheeled vehicle can be more reliably prevented from overturning.

Figure 3A:
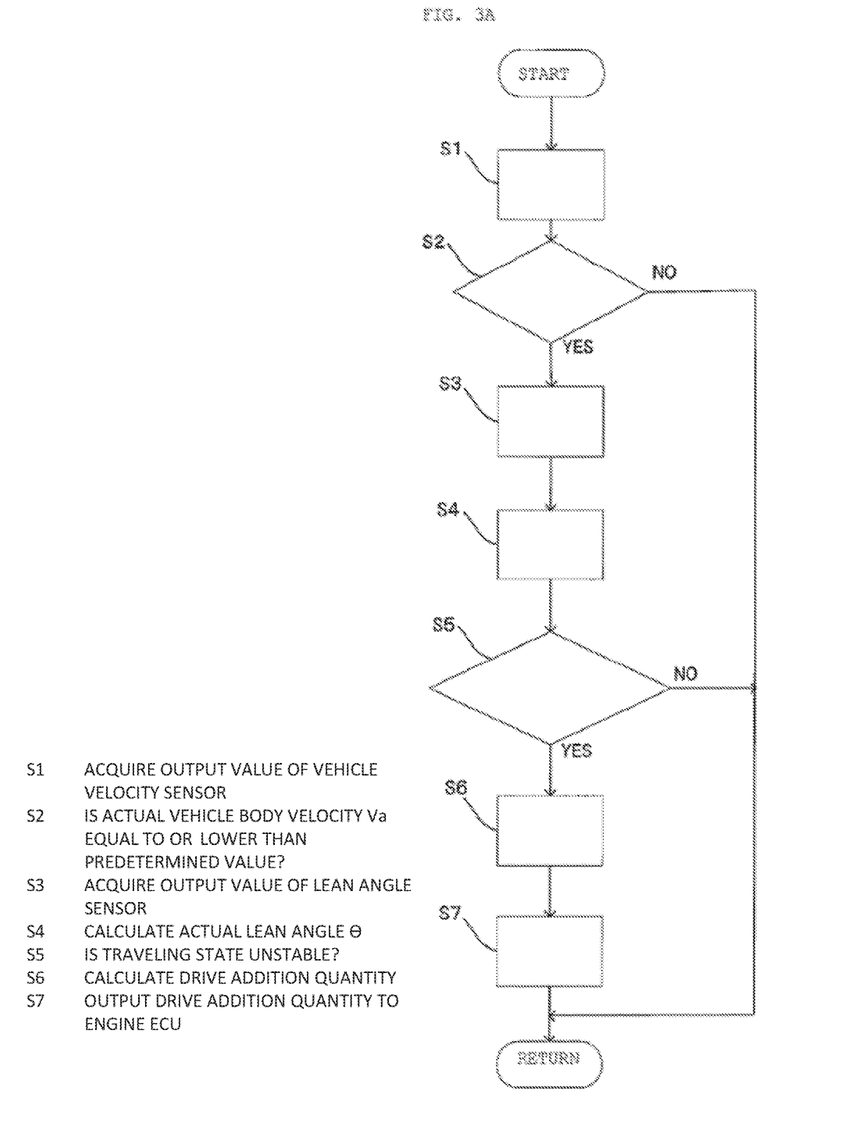
FIG. 3A is a flowchart showing processing in the method of the present invention.

Next, processing implemented in accordance with the method of the present invention will be specifically described. FIG. 3A is a flowchart showing an example of vehicle body velocity control processing by the two-wheeled vehicle overturn prevention device of FIG. 2A based on the above-described principle.

First, the output value is acquired from the vehicle velocity sensor (vehicle wheel velocity sensor) 1 (step 1). Next, it is judged whether or not an actual vehicle body velocity (actual vehicle body velocity) $V_a$ is equal to or lower than a predetermined value (step 2). The vehicle body is accelerated by the control processing according to the present invention, so in the present embodiment, in consideration of safety, a predetermined maximum value (e.g., 50 km/hr) is preset in regard to the vehicle body velocity, and processing is executed only in a case where the actual vehicle body velocity is equal to or lower than the maximum value. Because of this, the two-wheeled vehicle can be prevented from being further accelerated during high-speed travel.

When it is judged that the vehicle body velocity $V_a$ is equal to or lower than the predetermined value, the output value from the lean angle sensor 2 such as a yaw rate sensor, for example, is acquired (step 3). The actual lean angle (actual lean angle) θ of the vehicle body is calculated on the basis of this output value (step 4).

Figure 4:
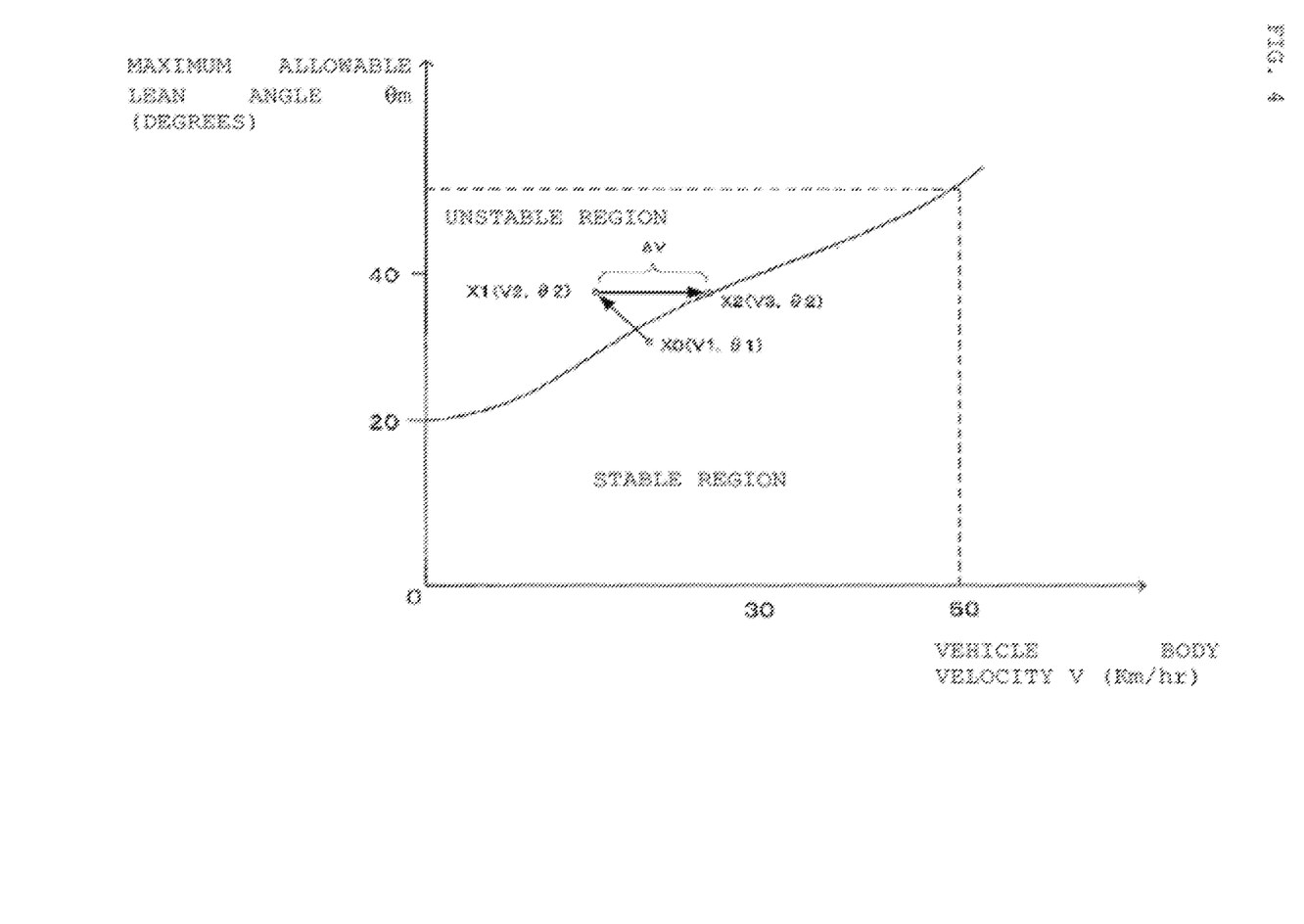
FIG. 4 is a drawing showing an example of a map used in the processing of FIG. 3A or FIG. 3B.

Next, in step 5, traveling instability of the vehicle body is judged, and for this judgment, maximum allowable lean angles $θ_m$ (degrees) relative to vehicle body velocities V are mapped beforehand and stored in the ECU. The maximum allowable lean angles $θ_m$ are maximum lean angles in a range in which there is no concern that the vehicle body traveling at a given vehicle body velocity V will overturn (or where it is supposed that the two-wheeled vehicle can be righted without overturning by the driver operating the accelerator). In terms of the example of FIG. 4, the maximum allowable lean angle $θ_m$ when the vehicle body velocity V=30 km/hr is set to 40 degrees. The correlation between the vehicle body velocity V and the maximum allowable lean angle $θ_m$ differs depending on the type of the vehicle body and is not limited to what is shown in FIG. 4, but regardless of the type of the vehicle body, the maximum allowable lean angle $θ_m$ tends to become larger as the vehicle body velocity V increases.

When the lean angle θ that has been calculated is in the region on the lower side of the curve on the map (in other words, the stable region), it is easy for the two-wheeled vehicle to achieve a balance between its right and left sides, and consequently the two-wheeled vehicle can stably travel without concern on the part of the driver that the two-wheeled vehicle will overturn, so it is judged that the traveling state is stable (NO). On the other hand, when the lean angle θ that has been calculated moves to the region on the upper side of the curve on the map (in other words, the unstable region), the two-wheeled vehicle is moving in the direction in which it will overturn, and it is judged that the traveling state is unstable (YES). In this case, it is necessary to increase the actual vehicle body velocity $V_a$, so in step 6, a drive addition quantity for output to the engine ECU is calculated. Additionally, a signal based on the drive addition quantity that has been calculated is output to the engine ECU. (step 7). On the basis of this signal, the engine ECU performs controls such as increasing the fuel injection quantity for acceleration and adjusting the opening degree of the throttle valve. These controls in the engine ECU are the same as what has been conventional, so description thereof will be omitted in this specification.

In a case where it has been judged in step 5 that the traveling state is stable (NO), the two-wheeled vehicle overturn prevention device returns to step 1 without performing the drive addition quantity calculation.

However, even when the two-wheeled vehicle overturn prevention device sends a drive addition command to the engine ECU, a time lag can occur until the actual engine drive force changes due to communication with the ECU and the engine ignition timing. Consequently, in the present invention, the two-wheeled vehicle overturn prevention device may also estimate the traveling state of the vehicle body after a predetermined amount of time and perform control so as change the engine drive force at a more appropriate timing.

Figure 3B:
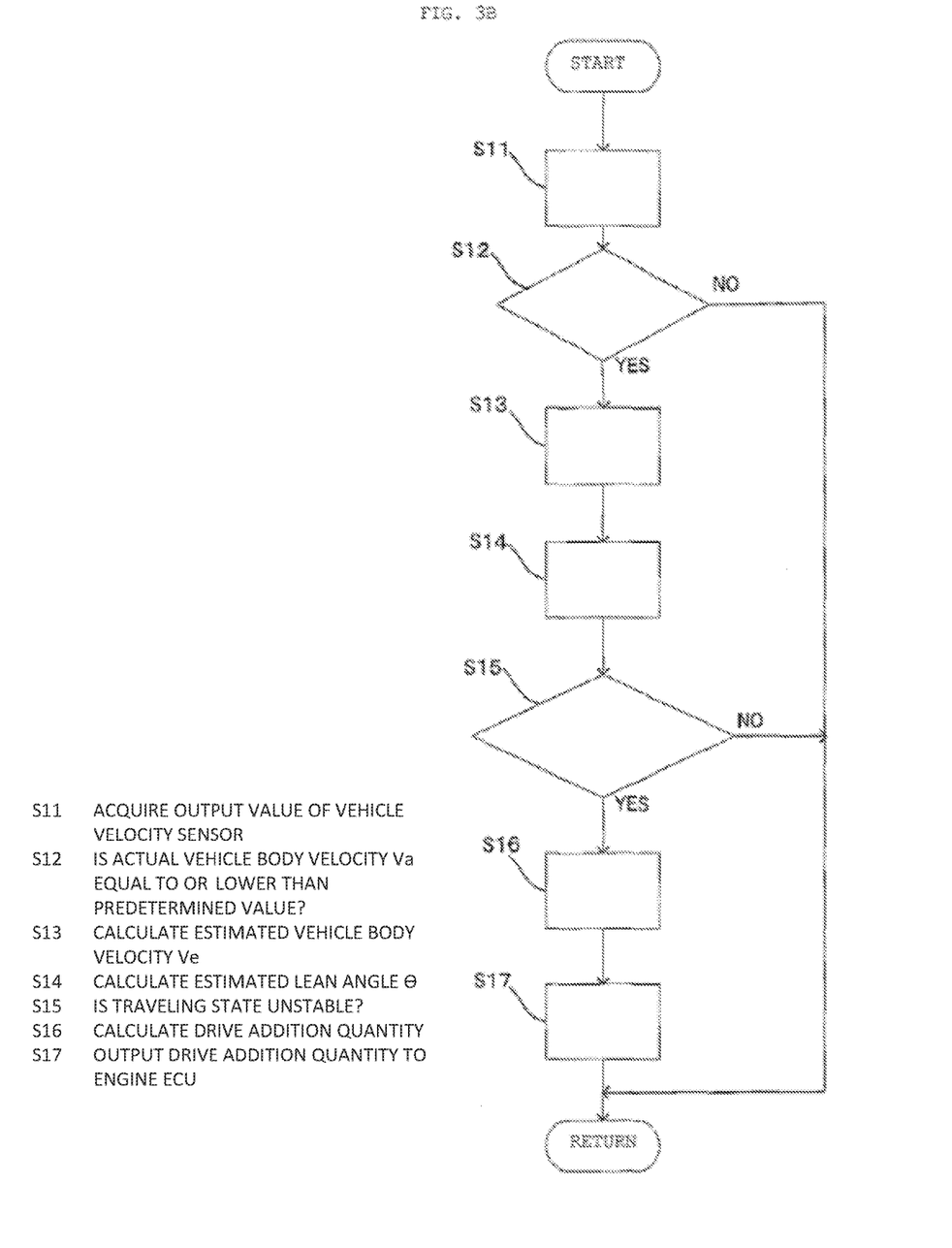
FIG. 3B is a flowchart showing processing in another embodiment of the method of the present invention.

FIG. 3B shows an example of vehicle body velocity control processing by the two-wheeled vehicle overturn prevention device shown in FIG. 2B. First, the output value is acquired from the vehicle velocity sensor (vehicle wheel velocity sensor) 1 (step 11). Next, it is judged whether or not the vehicle body velocity (actual vehicle body velocity) $V_a$ is equal to or lower than the predetermined value (step 12). When it is judged that the vehicle body velocity $V_a$ is equal to or lower than the predetermined value (YES), in step 13, an estimated vehicle body velocity $V_e$, which is a vehicle body velocity after a preset predetermined amount of time (e.g., a predetermined amount of time from the current time in step 13), is calculated on the basis of a temporal change in the value of the actual vehicle body velocity $V_a$ that has been stored in the vehicle body velocity storing means 7. Next, in step 14, an estimated lean angle $\theta_e$, which is a lean angle after a preset predetermined amount of time (e.g., a predetermined amount of time from the current time in step 14), is calculated on the basis of a temporal change in the actual lean angle $\theta$ that has been stored in the lean angle storing means 9. However, the estimated lean angle $\theta_e$ may also be calculated in step 13 and the estimated vehicle body velocity $V_e$ may also be calculated in step 14. In the present embodiment, the actual vehicle body velocity $V_a$ that is the output value of the vehicle velocity sensor 1 and the actual lean angle $\theta$ that has been calculated on the basis of the output value of the lean angle sensor 2 are always stored in the vehicle body velocity storing means 7 and the lean angle storing means 9, respectively. In step 15, a judgment of the traveling instability of the vehicle body is performed on the basis of the estimated vehicle body velocity $V_e$ and the estimated lean angle $\theta_e$. The judging method is substantially the same as the one in the embodiment of FIG. 3A, and the judgment is performed on the basis of a map such as the one shown in FIG. 4, for example, which is stored beforehand in the ECU. That is, when the estimated lean angle $\theta_e$ is in the stable region on the lower side of the curve on the map, it is judged that the traveling state is stable (NO), and when the estimated lean angle $\theta_e$ is in the unstable region on the upper side of the curve on the map, it is judged that the traveling state is unstable (YES). In the case of YES, it is necessary to accelerate the vehicle body or keep the vehicle body from decelerating so that the traveling state after the predetermined amount of time is in the stable region. Consequently, in step 16, a drive addition quantity for output to the engine ECU is calculated. Additionally, a signal based on the drive addition quantity that has been calculated is output to the engine ECU (step 17), and on the basis of this signal, the engine ECU performs controls such as increasing the fuel injection quantity and adjusting the opening degree of the throttle valve for acceleration or for keeping the vehicle from decelerating. Furthermore, in the present invention, even in a case where the estimated lean angle $\theta_e$ looks to move to the unstable region of FIG. 4, the two-wheeled vehicle overturn prevention device can judge in step 15 that the traveling state is unstable and perform control (that is, accelerating the vehicle body or keeping the vehicle body from decelerating) for not allowing the traveling state to move to the unstable region.

In this way, in the example of FIG. 3B, the judgment of the traveling instability of the vehicle body is performed on the basis of the estimated vehicle body velocity after the predetermined amount of time and the estimated lean angle after the predetermined amount of time. Because of this, the vehicle body can be accelerated at a more appropriate timing or the vehicle body can be kept from decelerating, so that the two-wheeled vehicle can be more reliably prevented from overturning.

In the present invention, the calculation of the drive addition quantity can be performed by PID control. This will be specifically described with reference again to FIG. 4.

In the case of the processing shown in FIG. 3A, let us suppose that, as shown in FIG. 4, there has been a change from a traveling state (X0) having an actual vehicle body velocity V1 and an actual lean angle $\theta$1 to a traveling state (X1) having an actual vehicle body velocity V2 and an actual lean angle $\theta$2. In this case, the traveling state after the change is in the unstable region, but it is possible to return the traveling state to a stable state without allowing the vehicle body to overturn by accelerating the vehicle body so as to minimize a difference $\Delta V$ between the actual vehicle body velocity V2 and a vehicle body velocity V3 corresponding to the actual lean angle $\theta$2 serving as the maximum allowable lean angle. Consequently, PID based on the difference $\Delta V$ between the actual vehicle body velocity V2 and the target vehicle body velocity V3 is performed. The value calculated by this PID control is output to the engine ECU as a drive addition quantity.

Likewise, in the case of the processing shown in FIG. 3B, let us suppose that it has been estimated in the traveling state (X0) having the actual vehicle body velocity V1 and the actual lean angle $\theta$1 that the traveling state after the predetermined amount of time is the traveling state (X1) having the estimated vehicle body velocity V2 and the estimated lean angle $\theta$2. In this case, the traveling state can be prevented from moving to the unstable region and the two-wheeled vehicle can be prevented from overturning by accelerating the vehicle body or keeping the vehicle body from decelerating so as to minimize the difference $\Delta V$ between the estimated vehicle body velocity V2 and the vehicle body velocity V3 corresponding to the estimated lean angle $\theta$2 serving as the maximum allowable lean angle. Consequently, PID based on the difference $\Delta V$ between the estimated vehicle body velocity V2 and the target vehicle body velocity V3 is performed, and the value calculated by this PID control is output to the engine ECU as a drive addition quantity.

Figure 5:
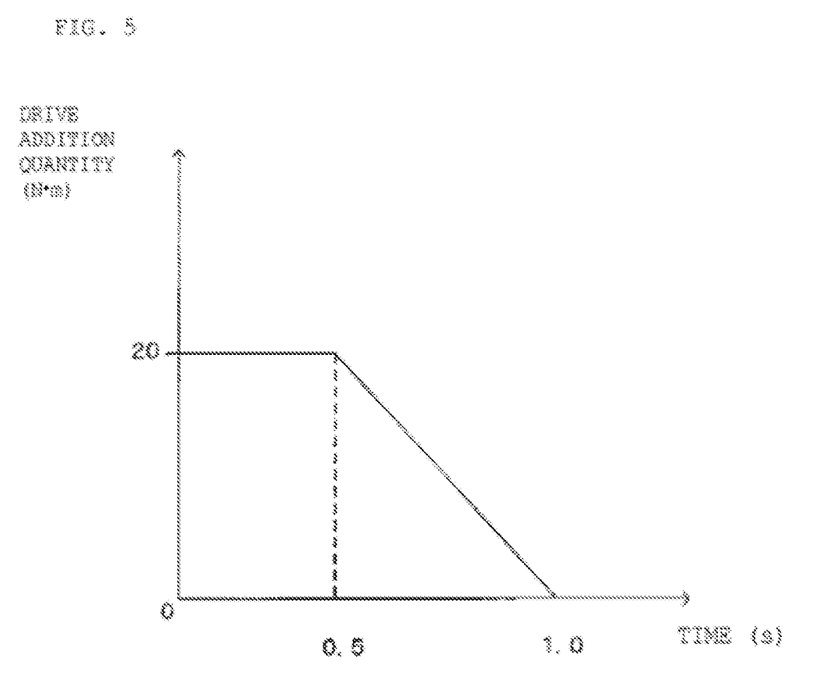
FIG. 5 is a drawing showing an example of the action of drive force increase limiting means.

However, as described above, the overturn prevention device of the present invention may also be equipped with drive force increase limiting means; in this case, a maximum value of the drive addition quantity that is output to the engine ECU is preset, and in a case where the drive addition quantity that has been calculated is maintained at the maximum value over the predetermined amount of time, the drive force increase limiting means may perform control that changes the drive addition quantity to zero after the drive addition quantity calculation (steps 6 and 16) and before the output to the engine ECU (steps 7 and 17). FIG. 5 shows an example of the action of the drive force increase limiting means. In this example, the maximum value of the drive addition quantity is set to 20 N·m, and the drive force increase limiting means changes the drive addition quantity to zero in a case where the drive addition quantity that is calculated in step 6 or step 16 is 20 N·m for 0.5 second. In this example, the drive addition quantity becomes zero after 1.0 second after reaching the maximum value. However, the specific maximum value of the drive addition quantity, the predetermined amount of time in which the maximum value is maintained, and the amount of time until the drive addition quantity is changed to zero are not limited to the example of FIG. 5. By limiting the drive force increase in this way, the two-wheeled vehicle can be prevented from being accelerated more than necessary in a case where an error has occurred in the lean angle detection value or the vehicle velocity correction quantity.

The present invention can be widely applied to two-wheeled motor vehicles.

REFERENCE SIGNS LIST

1 Vehicle Velocity Sensor
2 Lean Angle Sensor
3 Lean Angle Calculating Means
4 Instability Judging Means
5 Drive Addition Quantity Calculating Means
6 Drive Force Increase Instructing Means
7 Vehicle Body Velocity Storing Means
8 Vehicle Body Velocity Estimating Means
9 Lean Angle Storing Means
10 Lean Angle Estimating Means
100 Vehicle Wheels
101 Upper Structure of Two-wheeled Vehicle
102 Head of Driver

The invention claimed is:

1. A two-wheeled vehicle overturn prevention method, comprising
presetting maximum allowable lean angles corresponding to vehicle body velocities in relation to lean angles of a vehicle body,
estimating an estimated lean angle, which is a lean angle of the vehicle body after a predetermined amount of time, on the basis of a temporal change in an actual lean angle of the vehicle body,
estimating an estimated vehicle body velocity, which is a vehicle body velocity of the vehicle body after the predetermined amount of time, on the basis of a temporal change in an actual vehicle body velocity of the vehicle body, and
in a case where the estimated lean angle exceeds the maximum allowable lean angle corresponding to the estimated vehicle body velocity, accelerating the vehicle body or keep the vehicle.

2. The two-wheeled vehicle overturn prevention method according to claim 1, wherein
in a case where the estimated lean angle exceeds the maximum allowable lean angle corresponding to the estimated vehicle body velocity, an engine drive addition quantity is calculated so as to minimize the difference between a vehicle body velocity corresponding to the estimated lean angle serving as a maximum allowable lean angle and the estimated vehicle body velocity.

3. The two-wheeled vehicle overturn prevention method according to claim 2, wherein the drive addition quantity is calculated by PID control.

4. The two-wheeled vehicle overturn prevention method according to claim 2, wherein
a maximum value of the drive addition quantity is preset, and
in a case where the drive addition quantity that has been calculated has maintained the maximum value over a predetermined amount of time, the drive addition quantity is changed to zero.

5. The two-wheeled vehicle overturn prevention method according to claim 1, wherein the method is executed only in a predetermined vehicle body velocity region.

6. The two-wheeled vehicle overturn prevention method according to claim 1, wherein
an actual lean angle of the vehicle body is calculated on the basis of an output value of a lean angle sensor, and
the lean angle sensor is at least one of a lateral acceleration sensor, a vertical acceleration sensor, a yaw rate sensor, and a roll rate sensor.

7. A two-wheeled vehicle overturn prevention method, comprising
presetting maximum allowable lean angles corresponding to vehicle body velocities in relation to lean angles of a vehicle body, and
in a case where an actual lean angle of the vehicle body exceeds the maximum allowable lean angle corresponding to an actual vehicle body velocity of the vehicle body, accelerating the vehicle body.

8. The two-wheeled vehicle overturn prevention method according to claim 7, wherein
in a case where an actual lean angle of the vehicle body exceeds the maximum allowable lean angle corresponding to an actual vehicle body velocity of the vehicle body, an engine drive addition quantity is calculated so as to minimize the difference between a vehicle body velocity corresponding to the actual lean angle serving as a maximum allowable lean angle and the actual vehicle body velocity.

9. The two-wheeled vehicle overturn prevention method according to claim 8, wherein the drive addition quantity is calculated by PID control.

10. The two-wheeled vehicle overturn prevention method according to claim 8, wherein
a maximum value of the drive addition quantity is preset, and
in a case where the drive addition quantity that has been calculated has maintained the maximum value over a predetermined amount of time, the drive addition quantity is changed to zero.

11. The two-wheeled vehicle overturn prevention method according to claim 7, wherein the method is executed only in a predetermined vehicle body velocity region.

12. The two-wheeled vehicle overturn prevention method according to claim 7, wherein
an actual lean angle of the vehicle body is calculated on the basis of an output value of a lean angle sensor, and
the lean angle sensor is at least one of a lateral acceleration sensor, a vertical acceleration sensor, a yaw rate sensor, and a roll rate sensor.

13. A two-wheeled vehicle overturn prevention device comprising:
a vehicle velocity sensor that detects a vehicle body velocity;
a lean angle sensor for detecting a lean angle of a vehicle body;
lean angle calculating means that calculates a lean angle of the vehicle body on the basis of an output value of the lean angle sensor;
instability judging means that judges traveling instability of the vehicle body on the basis of the vehicle body velocity and the lean angle;
drive addition quantity calculating means that calculates an engine drive addition quantity in a case where it has been judged by the instability judging means that the vehicle body is unstable; and
drive force increase instructing means that outputs a drive addition quantity to an engine ECU, wherein maximum allowable lean angles corresponding to vehicle body velocities are preset in relation to lean angles of the vehicle body.

14. The two-wheeled vehicle overturn prevention device according to claim 13, further comprising
vehicle body velocity storing means that stores an output value of the vehicle velocity sensor,
lean angle storing means that stores an output value of the lean angle calculating means,
vehicle body velocity estimating means that calculates an estimated vehicle body velocity, which is a vehicle body velocity of the vehicle body after a predetermined amount of time, on the basis of a temporal change in an output value of the vehicle velocity sensor, and
lean angle estimating means that calculates an estimated lean angle, which is a lean angle of the vehicle body after a predetermined amount of time, on the basis of a temporal change in an output value of the lean angle calculating means,
wherein the instability judging means judges traveling instability of the vehicle body on the basis of the estimated vehicle body velocity and the estimated lean angle.

15. The two-wheeled vehicle overturn prevention device according to claim 14, wherein
the instability judging means judges traveling instability of the vehicle body on the basis of the estimated vehicle body velocity, the estimated lean angle, and the maximum allowable lean angle.

16. The two-wheeled vehicle overturn prevention device according to claim 15, wherein
the drive addition quantity calculating means calculates an engine drive addition quantity so as to minimize the difference between a vehicle body velocity corresponding to the estimated lean angle serving as a maximum allowable lean angle and the estimated vehicle body velocity.

17. The two-wheeled vehicle overturn prevention device according to claim 13, wherein
the instability judging means judges traveling instability of the vehicle body on the basis of the vehicle body velocity, the lean angle that has been calculated, and the maximum allowable lean angle.

18. The two-wheeled vehicle overturn prevention device according to claim 7, wherein
the drive addition quantity calculating means calculates an engine drive addition quantity so as to minimize the difference between a vehicle body velocity corresponding to the calculated lean angle serving as a maximum allowable lean angle and the vehicle body velocity that has been detected.

19. The two-wheeled vehicle overturn prevention device according to claim 13, wherein the drive addition quantity calculating means calculates a drive addition quantity by PID control.

20. The two-wheeled vehicle overturn prevention device according to claim 13, wherein
the two-wheeled vehicle overturn prevention device further comprises drive force increase limiting means which, in a case where the drive addition quantity that has been calculated has maintained the maximum value over a predetermined amount of time, changes the drive addition quantity to zero.

21. The two-wheeled vehicle overturn prevention device according to claim 13, wherein the two-wheeled vehicle overturn prevention device acts only in a predetermined vehicle body velocity region.

22. The two-wheeled vehicle overturn prevention device according to claim 13, wherein the lean angle sensor is at least one of a lateral acceleration sensor, a vertical acceleration sensor, a yaw rate sensor, and a roll rate sensor.

* * * * *